Nov. 1, 1927.

C. McPHERSON

POWER TRANSMISSION

Filed Dec. 5, 1924

INVENTOR
C. McPherson
By E.J Fetherstonhaugh
ATTORNEY

Nov. 1, 1927.    1,647,413
C. McPHERSON
POWER TRANSMISSION
Filed Dec. 5, 1924    4 Sheets-Sheet 2

INVENTOR
C. McPherson
By E.J. Fetherstonhaugh
ATTORNEY

Nov. 1, 1927.

C. McPHERSON

POWER TRANSMISSION

Filed Dec. 5, 1924

INVENTOR
C. McPherson.
by E.J. Fetherstonhaugh
ATTORNEY

Patented Nov. 1, 1927.

1,647,413

UNITED STATES PATENT OFFICE.

CHARLES McPHERSON, OF MONTREAL, QUEBEC, CANADA, ASSIGNOR, BY MESNE ASSIGNMENTS, TO FRICTION POWER CORPORATION LIMITED, OF MONTREAL, QUEBEC, CANADA.

POWER TRANSMISSION.

Application filed December 5, 1924. Serial No. 754,083.

The invention relates to power transmission as described in the present specification and illustrated in the accompanying drawings that form part of the same.

The invention consists essentially of the novel features of construction pointed out broadly and specifically in the claims for novelty following a description containing an explanation in detail of an acceptable form of the invention.

The objects of the invention are to eliminate the use of toothed gears in the operation of motor driven vehicles as far as it is possible to do so; to increase the flexibility of the parts required for connecting the motor to the driven axle shaft; to enable the driver of a motor vehicle to change speeds and directions with great facility and to avoid the dangers of fractures in the gearing; to convey the maximum power from the motor at low speeeds, thus furnishing ample power in emergency cases; to maintain the friction members in positive relation to one another and eliminate the bad effects of end thrust; to move forwardly and reverse direction of movement alternately without responsibility regarding stripping of gears; to furnish a transmitting device that may readily be applied to all manner of vehicles and vessels driven by power and to other uses not specified; and generally to provide a mechanism simple in its construction, durable in character and easy to operate.

In the drawings Figure 1 is a plan view showing the application of this invention to a motor car.

Like numerals of reference indicate corresponding parts in the various figures.

Figure 1:
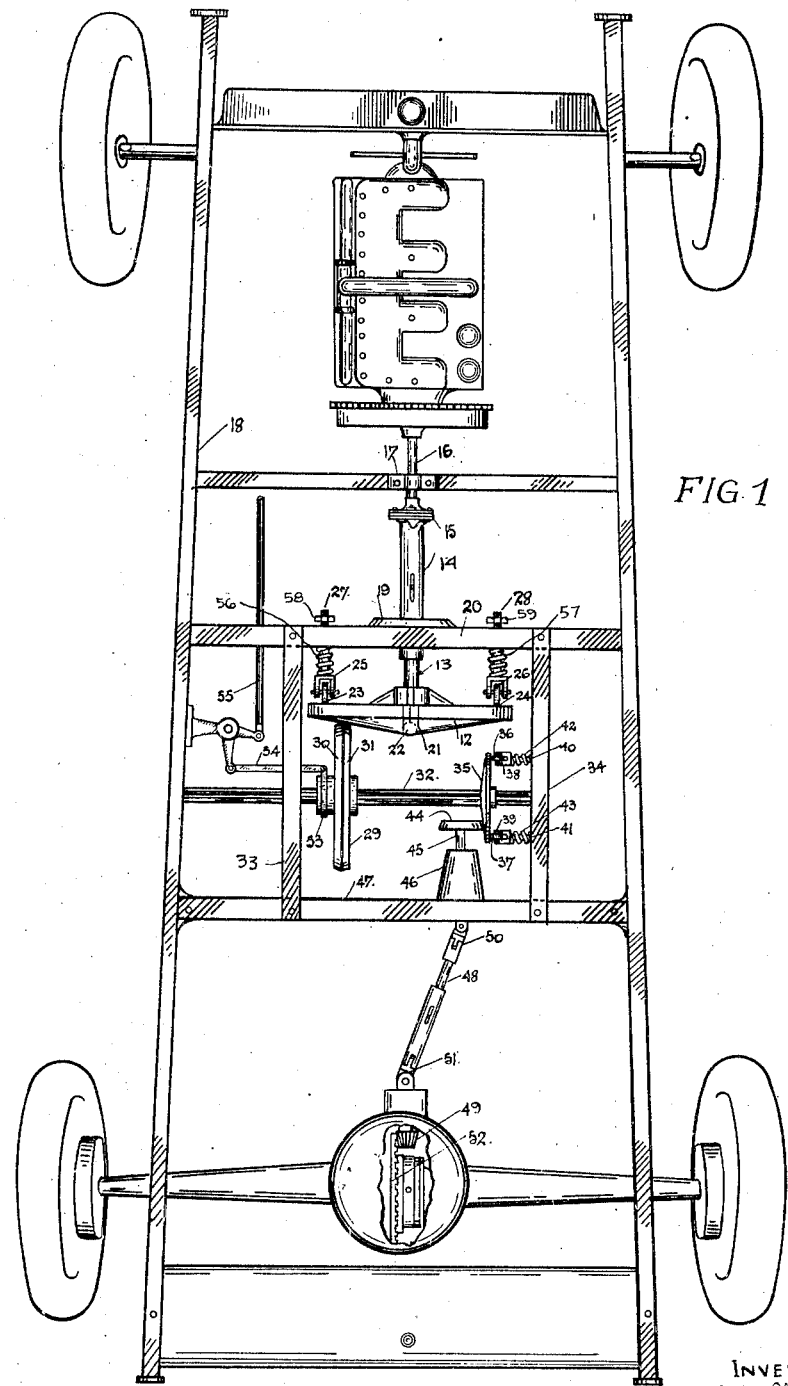
Figure 3:
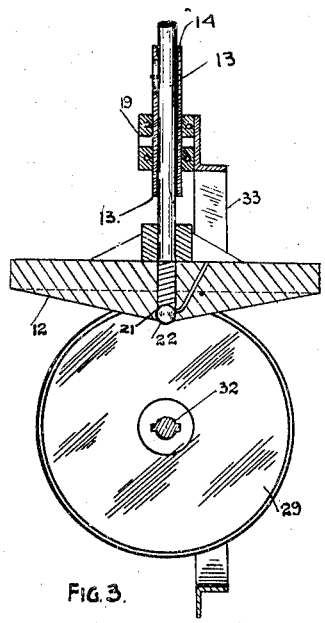
Figure 3 is a longitudinal sectional view on the line 3—3 in Figure 2.
Figure 10:
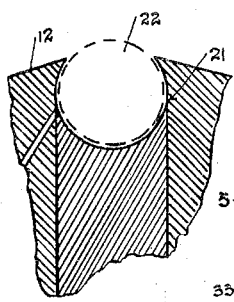
Figure 10 is a detail showing the disk bearing for the neutral ball.
Figure 2:
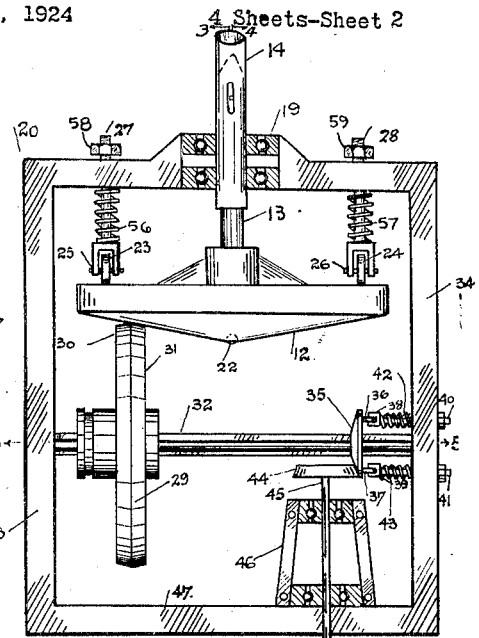
Figure 2 is an enlarged plan view of the transmission.
Figure 5:
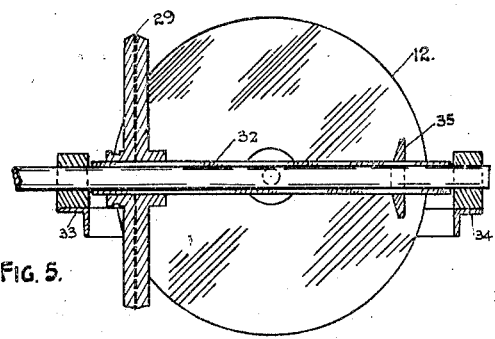
Figure 5 is a cross sectional view on the line 5—5 in Figure 2.
Figure 4:
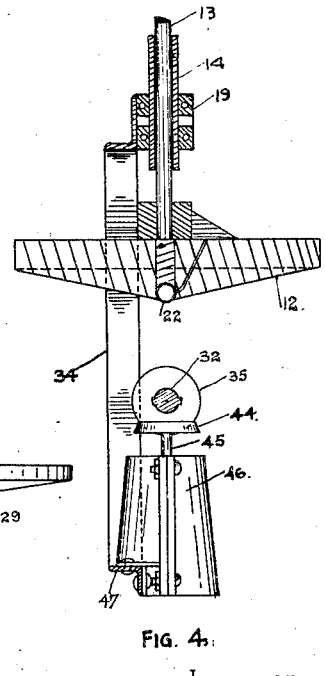
Figure 4 is a longitudinal sectional view on the line 4—4 in Figure 2.
Figures 6, 7:
Figure 6 is a diagrammatic view showing the friction wheel and disk in the high speed position.
Figure 7 is a diagrammatic view showing the wheel and disk in second speed position.
Figures 8, 9:
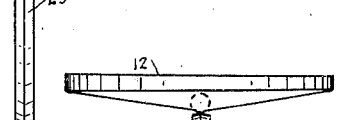
Figure 8 is a diagrammatic view showing the wheel and disk in neutral position.
Figure 9 is a diagrammatic view showing the wheel and disk in reverse position.
Figure 15:
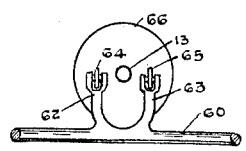
Figure 15 is a detail of the shifting lever.

Referring to the drawings, the disk 12 is fixedly mounted at the end of the slip shaft 13, which is keyed to the sleeve shaft 14 connected through the universal joint 15 to the engine shaft 16, the latter being journalled in the bearings 17 supported from the vehicle frame 18, said shaft 14 being journalled in the bearings 19 also supported from the frame.

The transmission frame 20, which may be suitably encased contains the disc 12 and the latter is tapered in cross section from the centre outwardly to the rim and in the centre or at the apex of the taper or bevel has the ball recess 21 in which the ball 22 is journalled.

The rollers 23 and 24 are held in engagement with the back of the disk 12 adjacent to the rim thereof and are journalled in the fork bearings 25 and 26 secured to the end of the pins 27 and 28 slidably mounted in the front bar of the transmission frame 20 and the springs 56 and 57 encircle said pins between the frame bar and the bearings and maintain the rollers 23 and 24 in constant resilient engagement, said pins having the nuts 58 and 59 on the outer ends.

The friction wheel 29 has the double bevelled engaging faces 30 and 31, one meeting the bevelled face of the disk 12, said wheel 29 being slidably mounted on the shaft 32, which is journalled in suitable bearings in the side bars 33 and 34 of the transmission frame 20 and in a bearing in the vehicle frame 18.

The bevelled disk 35 is mounted on the shaft 32 adjacent to the side bar 34 and is rotatable with and slidable on said shaft 32 and spring-held from the bar 34 by the rollers 36 and 37 engaging the back thereof, said rollers being journalled in the bearings 38 and 39 on the slidably supported pins 40 and 41 encircled by the springs 42 and 43 holding said rollers 36 and 37 to their engagement.

The bevelled friction wheel 44 is engaged by the friction disk 35 and is mounted on the shaft 45 which is journalled in the bearings 46 secured to the bar 47 of the frame 20, said shaft 45 projects through the bar 47 and rotates the slip shaft 48 and consequently the crown pinion 49 through the universal joints 50 and 51 and as the driving pinion operates the driving gear 52, the axle shafts will be driven and thereby rotate the wheels and propel the vehicle.

In the operation of this transmission, the engine being driven as customary, the motion is communicated to the disk shaft and consequently to the main driving disk.

The main driving disk is resiliently held against the double bevelled driving friction wheel and this communicates motion through the shaft 32 to the disk 35 which is spring held from the frame.

The disk 35 drives the bevelled friction wheel 44 by means of which the motion is communicated to the driving gears of the vehicle.

The friction wheel 29 is movable along the shaft 32 by means of the fork 53 operated through the levers 54 and 55 and slides inwardly on the disk 12 to the slower speed and naturally the drive becomes more powerful until it eventually reaches the central ball where it is in neutral position. After it is moved along the shaft 32 off the ball, it reaches the reverse position so that the transmission shaft and driving gear will turn in the opposite direction and the direction of the travel of the vehicle will be reversed. In the forward direction many different speeds may be used if desired and there is not the limit to first, second and high gears according to present practice as the driver may choose the speed anywhere between extreme high and extreme low speed.

Figure 12:
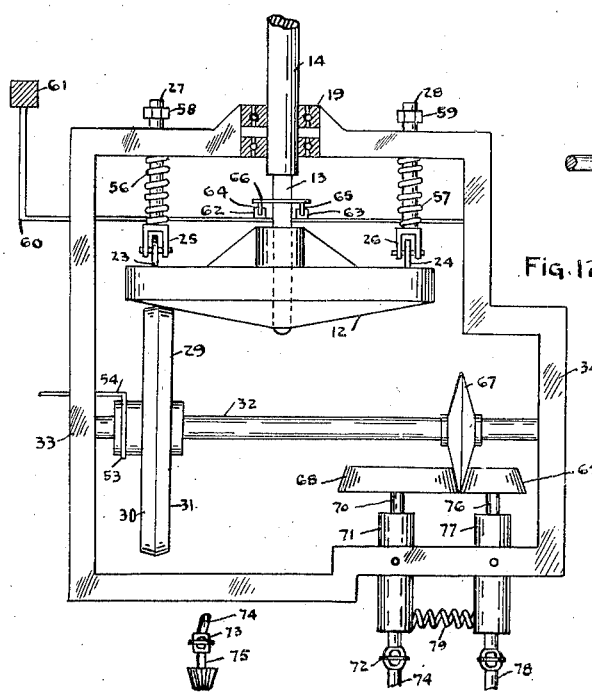
Figure 12 is a plan view of the transmission parts showing a modification of the assembly illustrated in Figure 2.

In Figure 12 the disk 12 remains the same in regard to its mounting and resiliency but the transverse shift shaft 60 is journalled in the frame and a pedal 61 attached thereto. The shift fingers 62 and 63 proceed from said shaft 60 and carry at their ends the rollers 64 and 65, which engage the collar 66 fixedly mounted on the slip shaft 13, and by means of this shift mechanism following pressure on the pedal 61, the disk 12 is forced towards the frame against the pressure of the springs 56 and 57.

The shifting of this disk 12 from its engagement with the friction wheel 29 relieves the latter, so that the speed changes may be made with great facility.

The tapered disk 67 is slidably mounted on the shaft 32 and is held between the bevel friction wheels 68 and 69 the wheel 68 being of greater diameter than the wheel 69. The friction wheel 68 is mounted at the end of the shaft 70 and extends through the rocker sleeve 71 pivotally secured to the frame and connected through the universal joint 72 and 73, and intermediate shaft 74 to the pinion shaft 75, which carries the pinion to drive the gear. The friction wheel 69 is mounted on the shaft 76 extending through the sleeve 77 pivotally mounted in the frame, said shaft being connected to an auxiliary shaft 78 for subsidiary machinery.

The spring 79 holds the outer sections of the rocker sleeves to move the inner sections together and consequently maintain the friction wheels to their engagement with the disk 67.

In this manner a through driving connection is maintained from the main driving disk 12, through the friction wheel 29, disk 67 and friction wheel 68 to the main driving gears as well as an auxiliary driving shaft for other uses.

Figure 13:
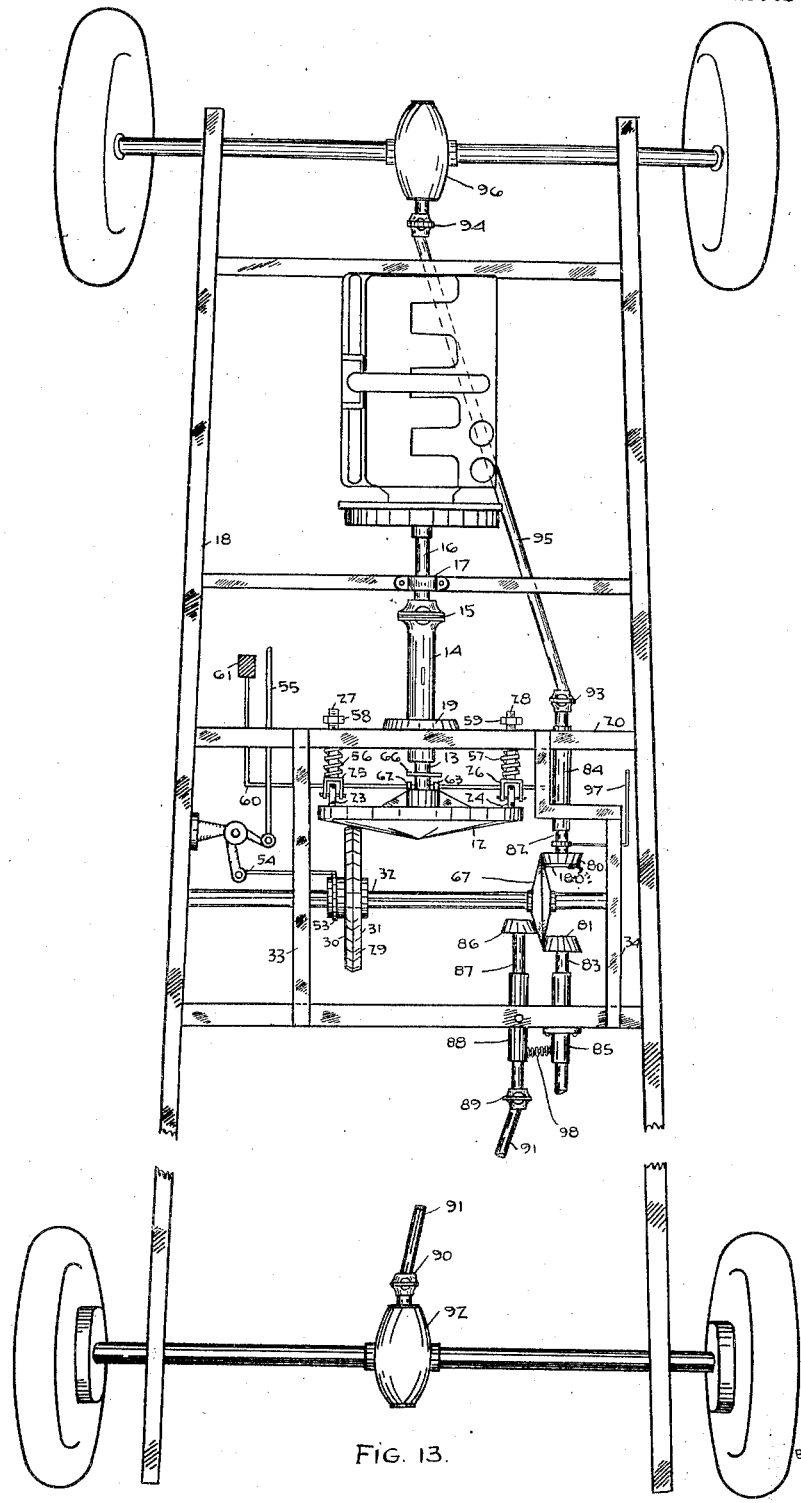
Figure 13 illustrates in a plan view another modification applicable to a four wheel drive.

In Figure 13 a driving mechanism is illustrated applicable to the four wheels of a vehicle and in this form of the invention the disk 12 and friction wheels 29 remain the same and also the disk 67 but the two friction wheels 80 and 81 engaging the rear side of the disk 67 are mounted on the shafts 82 and 83 in the stationary sleeve bearings 84 and 85, respectively, while the friction wheel 86 engages the front side of the disk between the wheels 80 and 81 and is mounted on the shaft 87 in the rocking sleeve bearing 88 pivotally secured to the frame. The shaft 87 is connected through the universal joints 89 and 90, and the intermediate shaft 91 to the driving gears in the case 92 in the rear axle.

Likewise the shaft 82 is connected through the joints 93 and 94 and intermediate shaft 95 to the driving gears in the case 96 in the front axle.

The disk 12 in this form is shown as shiftable from the wheel 29 and the latter is slidable on its shaft 32. Also the friction wheel 80 is releasable from its engagement with the disk 67 by means of any suitable shifting levers indicated by the numerals 97, so that the front axle shaft drive may be cut out when not required without releasing the pressure on the back of the disk 67 and this is maintained by the loosely mounted wheel section 180 forming part of a split friction roller described in a copending application.

A spring 98 is installed between the sleeve 84 and the sleeve 85 in order to maintain a constant pressure of the wheel 86 on the disk 67.

Figure 14:
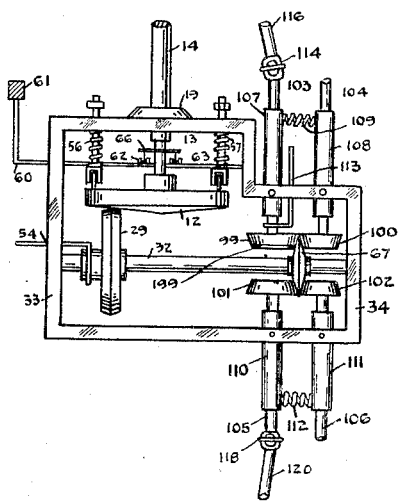
Figure 14 illustrates a plan view still another modification and applicable to a four wheel drive.

In Figure 14 the friction wheels 99 and 101 engage the disk 67 on the one side and friction wheels 100 and 102 engage the disk 67 on the other side. The wheels 99 and 100 are mounted on the shafts 103 and 104 and the wheels 101 and 102 on the shafts 105 and 106. The shafts 103 and 104 are journalled in the rocker sleeves 107 and 108 held apart between their outer sections by the spring 109, drawing their inner sections towards one another and consequently bringing pressure on the disk 67, through the wheels 99 and 100. A similar construction is shown in the rocker sleeves 110 and 111 forming bearings for the shafts 105 and 106, these rockers being pivoted in the frame opposite to the rocker sleeves 107 and 108 and having the spring 112 holding the outer ends apart.

The friction wheel 99 is shifted by any suitable lever mechanism here indicated by the numeral 113 and moved away from engagement with the disk 67, thus cutting out the front wheel drive, when it is desirable to do so, but in making this shift the pressure on the disk 67 is not relieved as there is a loose wheel 199 forming a wheel section that remains in contact with the disk 67 and maintains the pressure, this construction being more particularly described in a copending application Serial No. 745,532, filed October 23, 1924.

The shaft 103 is connected through the universal joints 114 and 115 and intermediate shaft 116 to the driving gears 117 on the front axle.

The shaft 105 is connected through the universal joints 118 and 119 and intermediate shaft 120 to the driving gears 121 on the rear axle, thus completing a four wheel drive and establishing a connection frontwardly and rearwardly of the engine equipment to the driving gears.

In this form of the invention the disk 12 is shown as shiftable from the wheel 29 and the latter as slidable on the shaft 32 in fact in any form of the invention this shift mechanism is applicable.

The shafts 104 and 106 extend from the sleeves 108 and 111 for use in making any desirable auxiliary connections.

Figure 11:
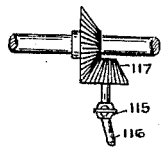
Figure 11 is a detail of the driving disk showing another form of central bearing for the friction wheel in the neutral position on the disk.
Figure 11:
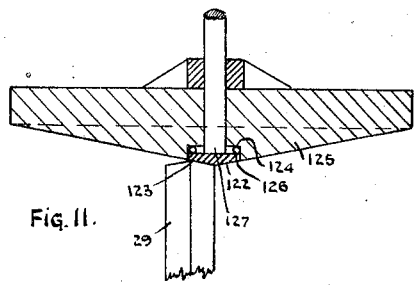

In Figure 11 a modification of the neutral bearing for the wheel 29 is shown in which a bevelled plate 122 forms a head on the stem 123 and is mounted on ball bearings 124 in the disk 125 having the central ball recess 126 and stem hole 127 from said recess.

The plate 122 is bevelled from the centre outwardly, so that it will always provide ample bearing surface for the double bevelled wheel 29.

It will be noticed that in these later forms of the invention, the balanced form of friction drive is applied in many ways so that wherever possible the pressure is equalized on either side of the driving disk and the effect of the end thrust minimized to such an extent as to make it negligible.

Several forms of this invention are illustrated herein in all of which the main parts are the same.

What I claim is:—

1. In power transmission, a main driven disk having a bevelled friction face extending from a central cup for a bearing and flexible connections to the power, a ball in said cup bearing forming a neutral contact, an intermediate friction member coacting with said disk, and slidably arranged on the face thereof, friction members operated by said intermediate member and operatively connected to the objective and resilient means for holding the coacting friction members in operative relationship.

2. In power transmission, a frame, a driving disk flexibly and operatively connected to the power and slidably journalled in a bearing member in said frame, cushion springs between said disk and said bearing member, a transverse shaft journalled in said frame, and a friction wheel thereon engaged by said driving disk, rocker sleeves spring-held apart at one end and pivoted on said frame, a friction disk on said transverse shaft, friction gearing driving shafts supported by said rocker sleeves, and friction wheels on said rocker sleeve shafts, driven by the latter disk.

3. In power transmission, a frame, a driving disk and shaft therefor, flexibly and operatively connected to the power and slidably journalled in said frame, an intermediate friction wheel, engaged by said disk, rocker shafts spring held apart at their outer ends and pivotally secured to said frame, a transverse shaft carrying said wheel, a friction disk on said transverse shaft, friction wheels engaging respectively either side of said disk, on the transverse shaft, and shafts journalled in said rocker arms and flexibly connected to the vehicle propelling mechanism.

4. A power transmitting device comprising a main disk suitably mounted and driven, a reciprocating slip shaft universally connected to an engine shaft, a friction wheel engaged thereby and formed to move over the surface of said disk for change speed and reverse movements, friction gearing including a pair of rollers, a shaft carrying the aforesaid friction wheel, a secondary disk mounted in said friction wheel shaft and engaged by said rollers, one on either side, flexible shafts extending from said rollers to the propelling members and driven by said secondary disk through said rollers, and rocker sleeves forming bearings for said roller shafts, an operating lever adapted to draw said main disk from engagement with said friction wheel and means for engaging said operating lever and said slip shaft.

5. In power transmission, a frame, a main driving disk resiliently held from the frame, an engine driven shaft slidably arranged and carrying said driving disk, a transverse shaft journalled in said frame, a coacting friction wheel slidably mounted on said transverse shaft, a secondary disk slidably mounted on said transverse shaft, a pair of rocker arms pivotally secured in a front bar of said frame and spring held apart at their outer ends, a pair of rocker arms pivotally secured in a rear bar of said frame and spring-held apart at their outer ends, friction gear shafts journalled in said rocker arms, friction gears on said shafts engaging said secondary disk on either side and balancing the pressure, shafts flexibly connecting a front rocker arm shaft to the vehicle front driving gear, shafts flexibly connecting a rear rocker arm shaft to a rear vehicle driving geaar, and means for easing the pressure of the main disk, on the intermediate friction wheel for changing speed and reversing.

6. In power transmission, a frame offset at one side to form an inner front bar, a main driving disk resiliently held from the frame and having its shaft slidably arranged, a transverse shaft journalled in said frame, a coacting friction wheel slidably mounted on said transverse shaft, a secondary disk slidably mounted in said transverse shaft, a pair of rocker arms pivotally secured in a front bar of said frame and spring held apart at their outer ends, a pair of rocker arms pivotally secured in a rear bar of said frame and spring-held apart at their outer ends, friction gear shafts journalled in said rocker arms, friction gears on said shafts, engaging said secondary disk on either side and balancing the pressure, shafts flexibly connecting a front rocker arm shaft to the vehicle front driving gear, shafts flexibly connecting a rear rocker arm shaft to a rear vehicle driving gear, and means for easing the pressure of the main disk, on the intermediate friction wheel for changing speed and reversing.

7. In power transmission, a frame, a main disk, resiliently held from said frame and having a neutral centre piece independently movable and a shaft extending from the rear thereof slidably journalled in said frame, a transverse shaft journalled in said frame, a coacting friction wheel on said transverse shaft and slidably therealong, a secondary disk slidable on said transverse shaft, friction gears engaging said secondary disk and shafts therefrom, bearings for said gear shafts having rocker members spring-held to exert pressure on the secondary disk through the gears, flexible connections from the friction gearing to the vehicle drive, and lever mechanism for easing the pressure on said main disk on the coacting wheel in changing speed and reversing.

Signed at Montreal, Canada this 26th day of November, 1924.

CHARLES McPHERSON.